(12) United States Patent
Naito

(10) Patent No.: US 8,345,408 B2
(45) Date of Patent: Jan. 1, 2013

(54) METHOD FOR PRODUCING SOLID ELECTROLYTIC CAPACITOR

(75) Inventor: Kazumi Naito, Tokyo (JP)

(73) Assignee: Showa Denko K.K., Tokyo (JP)

( * ) Notice: Subject to any disclaimer, the term of this patent is extended or adjusted under 35 U.S.C. 154(b) by 168 days.

(21) Appl. No.: 12/889,098

(22) Filed: Sep. 23, 2010

(65) Prior Publication Data

US 2011/0069427 A1 Mar. 24, 2011

(30) Foreign Application Priority Data

Sep. 24, 2009 (JP) ................... 2009-219375

(51) Int. Cl.
*H01G 9/00* (2006.01)
(52) U.S. Cl. ........ 361/523; 361/517; 361/525; 361/528; 361/529; 361/540
(58) Field of Classification Search .................. 361/523, 361/516–519, 525, 528–529, 534, 540–541; 29/25.01, 25.03
See application file for complete search history.

(56) References Cited

U.S. PATENT DOCUMENTS

| | | | |
|---|---|---|---|
| 7,333,319 B2* | 2/2008 | Matsuoka | 361/523 |
| 7,495,890 B2* | 2/2009 | Chacko | 361/523 |
| 2006/0221557 A1 | 10/2006 | Ohtsu | |
| 2006/0262488 A1 | 11/2006 | Naito et al. | |

FOREIGN PATENT DOCUMENTS

| | | |
|---|---|---|
| JP | 5-234829 A | 9/1993 |
| JP | 2005-93994 A | 4/2005 |
| JP | 2006-310809 A | 11/2006 |
| WO | 2009/101963 A1 | 8/2009 |

* cited by examiner

Primary Examiner — Nguyen T Ha
(74) Attorney, Agent, or Firm — Sughrue Mion, PLLC

(57) ABSTRACT

A method for producing a solid electrolytic capacitor, which comprises the steps of:
laying a plurality of solid electrolytic capacitor elements in proximity to each other in parallel on a cathode lead portion of a lead frame with a conductive adhesive, and
electrically connecting the solid electrolytic capacitor elements to the cathode lead portion so that the conductive adhesive gets into a gap between the solid electrolytic capacitor elements.

8 Claims, 2 Drawing Sheets

METHOD FOR PRODUCING SOLID ELECTROLYTIC CAPACITOR

This application claims foreign priority benefit pursuant to 35 U.S.C. 119 of Japanese Patent Application No. 2009-219375 filed on Sep. 24, 2009, the disclosures of which are incorporated herein by reference.

TECHNICAL FIELD

The present invention relates to a method for producing a solid electrolytic capacitor. More particularly, the present invention relates to a method for producing a solid electrolytic capacitor which has high capacity, exhibits small deviation of equivalent series resistance (ESR) and is excellent in productivity.

BACKGROUND ART

A solid electrolytic capacitor is produced by encapsulating a solid electrolytic capacitor element with a resin or the like. The solid electrolytic capacitor element comprises, for example, a laminate of an anode body, a dielectric layer, a semiconductor layer and a conductor layer in this order, in which the anode body is connected to a lead wire. The anode body is composed, for example, of a porous body obtained by compacting a valve action metal powder, and followed by sintering. The dielectric layer is composed, for example, of an insulating oxide thin layer obtained by anodizing the surface of the porous body. The semiconductor layer serves as a cathode relative to the anode body through the dielectric layer. The conductor layer is provided so as to facilitate electrical connection to the cathode. The conductor layer covers the periphery of the element, excluding the vicinity of the connection portion between the lead wire and the anode body. The cathode portion of the solid electrolytic capacitor element is composed of the semiconductor layer and the conductor layer.

The solid electrolytic capacitor element is laid on a cathode lead portion of a lead frame (hereinafter sometimes referred to simply as a "cathode lead") and the conductor layer existing on the periphery of the element is electrically connected to the cathode lead. The cathode load is partially exposed on the outside of an outer packaging of the solid electrolytic capacitor to form a cathode terminal. On the other hand, the lead wire connected to the anode body (hereinafter sometimes referred to simply as an "anode lead wire") is electrically connected to an anode lead portion of the lead frame (hereinafter sometimes referred to simply as a "anode lead") and the anode lead is partially exposed on the outside of the outer packaging of the solid electrolytic capacitor to form an anode terminal.

A conductive adhesive such as adhesive silver paste is used so as to connect the solid electrolytic capacitor element to the cathode lead. Usually, the solid electrolytic capacitor element and the cathode lead are electrically connected so that conductive adhesive does not protrude from the connection surface of the solid electrolytic capacitor element and the cathode lead. When the conductive adhesive protrudes, it must be handled in the same manner as in the case using a solid electrolytic capacitor element with a large overall size, and therefore it is not preferred.

PLT 1 has proposed a solid electrolytic capacitor having high capacity and excellent high frequency property, in which a plurality of solid electrolytic capacitor elements are laid in parallel on a lead frame including a pair of opposing lead portions extending toward the inside of the frame. In this solid electrolytic capacitor, the plurality of solid electrolytic capacitor elements are laid adjacent to each other in parallel and encapsulated with an encapsulation resin material or the like. The encapsulation resin material usually has electrical insulating properties.

PLT 2 has proposed that a fixed layer extending between a plurality of solid electrolytic capacitor elements laid in proximity to each other in parallel is placed. The fixed layer placed so as to extend between solid electrolytic capacitor elements can prevent an encapsulation resin material from flowing into a gap between solid electrolytic capacitor elements. Thus, it is made possible to obtain a chip-shaped solid electrolytic capacitor which has low equivalent series resistance and low leakage current. Air remains in the gap between solid electrolytic capacitor elements. Air has electrical insulating properties.

PLT 3 discloses a solid electrolytic capacitor in which solid electrolytic capacitor elements are not laid adjacent to each other, but the solid electrolytic capacitor elements are laid by intentionally increasing a gap therebetween so that an encapsulation resin material positively flows into the gap. The encapsulation resin material usually has electrical insulating properties. PLT 3 describes that it is possible to prevent large deterioration of equivalent series resistance (ESR), leakage current (LC) and the like in a durability test of allowing to stand in the environment maintained at a temperature of 60° C. and a relative humidity of 90 to 95% for a long time as the encapsulation resin material flowed positively serves as a cushion.

PLT 4 describes that a solid electrolytic capacitor, which scarcely exhibits an increase in a leakage current even when heat shock or the like, due to solder heat is applied, is obtained by adjusting the proportion of air in a gap between adjacent solid electrolytic capacitor elements to 60 volume % or less. In order to remove air from the gap between solid electrolytic capacitor elements, a resin or an oily substance is absorbed in the gap. PLT 4 teaches that the resin or oily substance preferably has electrical insulating properties.

CITATION LIST

Patent Literature

PLT1: Japanese Patent Laid-Open No. H05-234829,
PLT2: Japanese Patent Laid-Open No. 2005-93994 equivalent to US2006/262488,
PLT3: Japanese Patent Laid-Open No. 2006-310809 equivalent to US2006/221537, and
PLT4: WO 2009/101963

SUMMARY OF INVENTION

Technical Problem

However, when the solid electrolytic capacitor is mass-produced in accordance with the methods disclosed in PLT 1, 2, 3 or 4 using a solid electrolytic capacitor element produced industrially in large amounts, the value of ESR varies and thus it was difficult to stably produce a solid electrolytic capacitor in which ESR is controlled within a predetermined range.

An object of the present invention to provide a method for producing a solid electrolytic capacitor which has high capacity, exhibits small deviation of ESR and is excellent in productivity.

Solution to Problem

The present inventor has intensively studied so as to achieve the above object and found that deviation of ESR remarkably decreases when a solid electrolytic capacitor is produced by laying a plurality of solid electrolytic capacitor elements in proximity to each other in parallel on a cathode lead portion of a lead frame through a conductive adhesive, and electrically connecting the solid electrolytic capacitor element to the cathode lead portion so that the conductive adhesive gets into a gap between the solid electrolytic capacitor elements. The present invention has been completed by further studying based on this finding.

The present invention includes the followings.

<1> A method for producing a solid electrolytic capacitor, which comprises the steps of;
laying a plurality of solid electrolytic capacitor elements in proximity to each other in parallel on a cathode lead portion of a lead frame through a conductive adhesive, and
electrically connecting the solid electrolytic capacitor elements to the cathode lead portion so that the conductive adhesive gets into a gap between the solid electrolytic capacitor elements.

<2> The method for producing a solid electrolytic capacitor according to <1>, wherein an average width of the gap between the solid electrolytic capacitor elements is set to 250 µm or less.

<3> The method for producing a solid electrolytic capacitor according to <1> or <2>, wherein the step of electrically connecting the solid electrolytic capacitor elements to the cathode lead portion so that the conductive adhesive gets into the gap between the solid electrolytic capacitor elements includes pressing the plurality of solid electrolytic capacitor elements laid on the cathode lead portion through a conductive adhesive layer against the cathode lead portion.

<4> The method for producing a solid electrolytic capacitor according to any one of <1> to <3>, which prevents the conductive adhesive from protruding out of a maximum external dimensions of the plurality of solid electrolytic capacitor elements laid on the cathode lead portion.

<5> The method for producing a solid electrolytic capacitor according to any one of <1> to <4>, wherein the conductive adhesive is a silver paste.

<6> The method for producing a solid electrolytic capacitor according to any one of <1> to <5>, wherein the solid electrolytic capacitor element is made by preparing a sintered compact of a valve action metallic material or a sintered compact of a conductive oxide as an anode body, and forming a dielectric layer in the surface of the anode body, and then stacking a semiconductor layer and a conductor layer on the dielectric layer in this order.

<7> A solid electrolytic capacitor produced by the method according to any one of <1> to <6>.

<8> A solid electrolytic capacitor comprising:
an anode lead and a cathode lead facing each other while being separated,
two or more solid electrolytic capacitor elements comprising an anode portion and a cathode portion, and an encapsulating material for encapsulating the anode lead, the cathode lead and the solid electrolytic capacitor elements, wherein
the two or more solid electrolytic capacitor elements are laid in proximity to each other in parallel, the anode portion or the elements is conductively connected to a tip of the anode lead, the cathode portion of the elements is conductively connected to a tip of the cathode lead with a conductive adhesive, and also the conductive adhesive gets into a gap between the solid electrolytic capacitor elements.

Advantageous Effect of Invention

According to the present invention, it is possible to provide a solid electrolytic capacitor which has high capacity, exhibits small deviation of ESR and is excellent in mass productivity, industrially and stably.

The reason why the production method of the present invention gives a solid electrolytic capacitor having low deviation of ESR is not certain, but is considered as follows.

Even when given-sized solid electrolytic capacitor elements are arranged in tight contact with each other, a gap is created between the elements by delicate unevenness of the element surface. A width of the gap is not necessarily constant. The width of the gap has a negative correlation with ESR of the solid electrolytic capacitor. That is, the smaller the width of the gap, the higher ESR or the solid electrolytic capacitor. From the above reason, it is considered that ESR of the solid electrolytic capacitor varies.

Heretofore, as described in the above Patent Literatures, the gap has been filled with an electrical insulating encapsulation resin material or an electrical insulating gas such as air. Under these circumstances, the present inventor has made a trial of filling the gap with a conductive substance. As a result, the inventor has found that higher effect of decreasing ESR of the solid electrolytic capacitor is exerted as a contact area between the conductive substance filled in the gap and the cathode portion of the solid electrolytic capacitor element increases, and that, when the solid electrolytic capacitor elements arranged in proximity to each other are pressed against a cathode lead coated with a conductive adhesive, the conductive adhesive getting into the gap between the solid electrolytic capacitor elements extends inside the gap in a larger area as the width of the gap decreases. In contrast, the area of the conductive adhesive extending inside the gap decreases as the width of the gap increases.

As a result, when the width of the gap is ESR of the solid electrolytic capacitor should increases. However, since the contact area between the conductive adhesive getting into the gap and the cathode portion of the solid electrolytic capacitor element increases, higher effect of decreasing ESR of the solid electrolytic capacitor is exerted, resulting in totally low ESR. In contrast, when the width of the gap is large, since the contact area between the conductive adhesive getting into the gap and the cathode portion of the solid electrolytic capacitor element is not so wide, any effect of decreasing ESR of the solid electrolytic capacitor cannot be expected. However, when the width of the gap is large, ESR of the solid electrolytic capacitor element is originally low, resulting in totally low ESR. As described above, it is considered that variation in ESR of the solid electrolytic capacitor caused by the width of the gap or the like is suppressed due to the conductive adhesive gets into the gap.

DESCRIPTION OF EMBODIMENTS

The present invention will be described in detail below.

Figure 1:
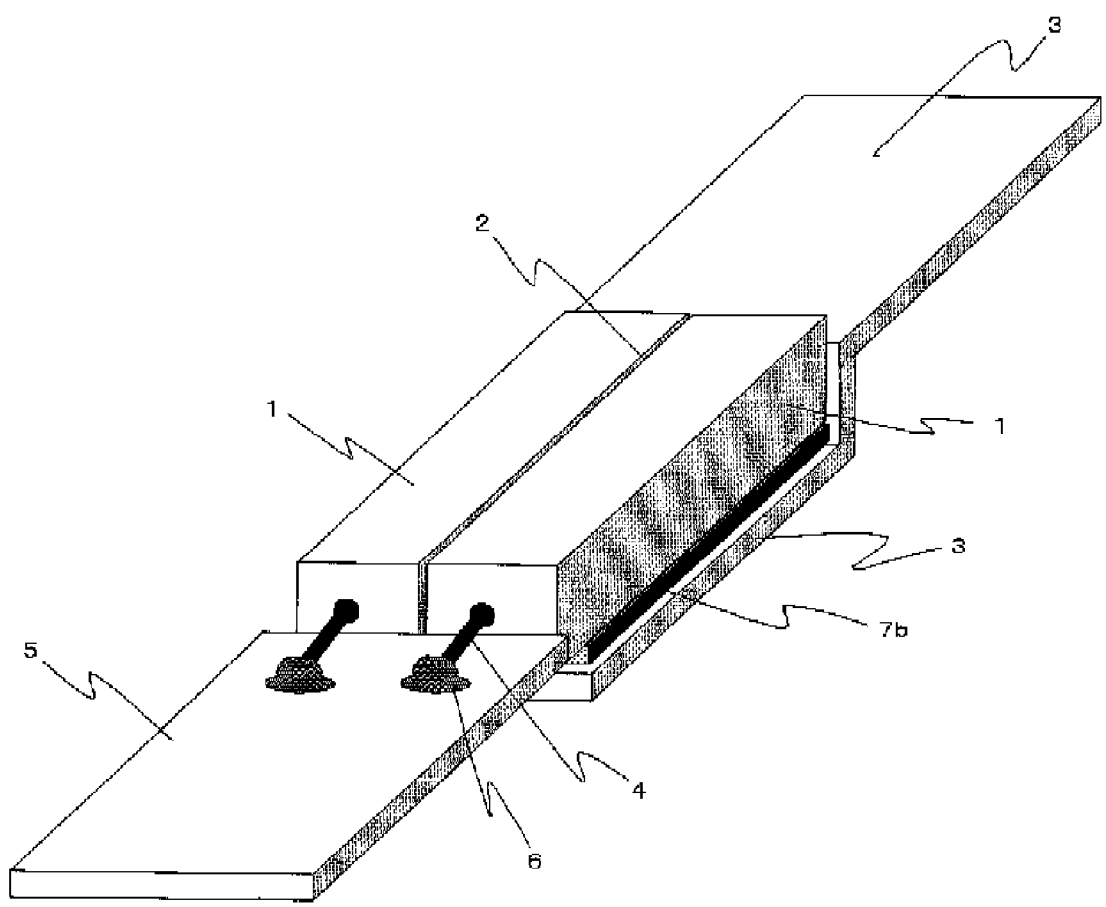
FIG. 1 is a schematic view showing one embodiment of an internal structure of a solid electrolytic capacitor according to the present invention.
Figure 2:
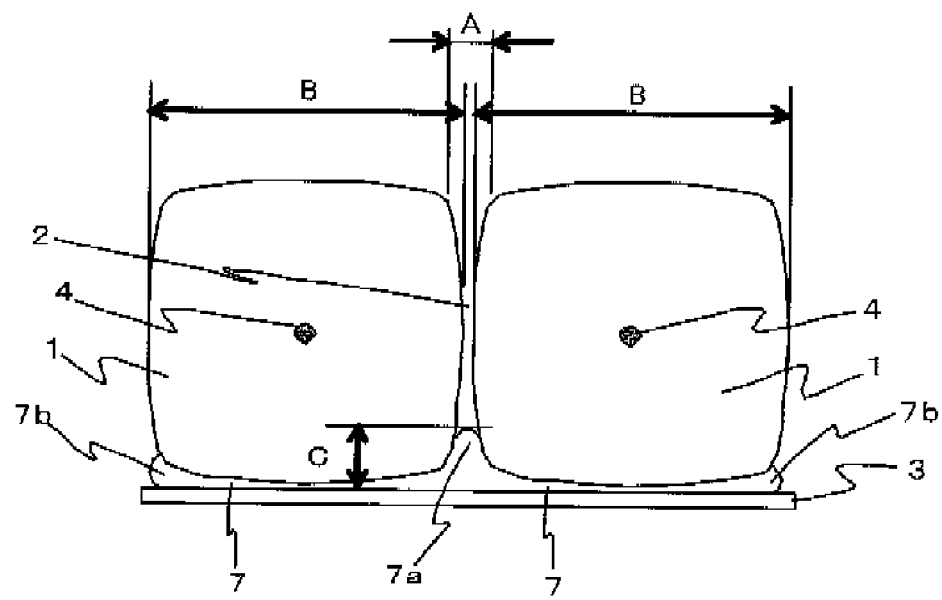
FIG. 2 is a diagram showing one embodiment showing a state where a conductive adhesive gets into a gap in the solid electrolytic capacitor shown in FIG. 1.
Figure 3:
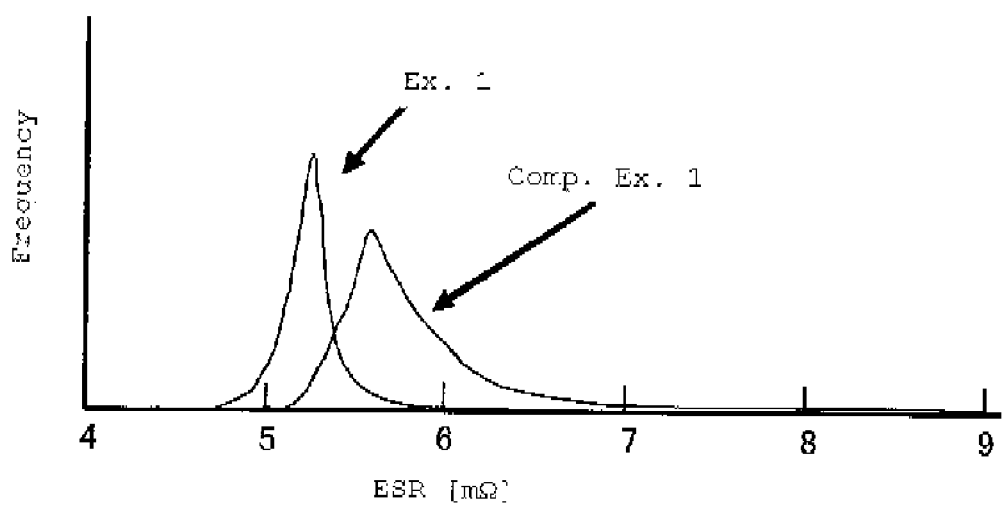
FIG. 3 is a graph showing frequency distribution of ESR of solid electrolytic capacitors obtained in Example 1 and Comparative Example 1.

The solid electrolytic capacitor of the present invention comprises an anode lead and a cathode lead facing each other while being separated, two or more solid electrolytic capacitor elements including an anode portion and a cathode portion, and an encapsulating material for encapsulating the anode lead, the cathode lead and the solid electrolytic capacitor elements. In the solid electrolytic capacitor of the present invention, the two or more solid electrolytic capacitor elements are in proximity to each other in parallel and the anode portion of the elements is conductively connected to a tip of the anode lead, the cathode portion of the element is conductively connected to a tip of the cathode lead through a conductive adhesive, and also the conductive adhesive gets into a gap between the solid electrolytic capacitor elements. FIG. 1 shows a state where two solid electrolytic capacitor elements 1 are laid in proximity to each other in parallel on a cathode lead 3. FIG. 2 shows a state where the solid electrolytic capacitor elements 1 and the cathode lead 3 are bonded with the conductive adhesive 7 and also the conductive adhesive 7a gets into a gap between adjacent solid electrolytic capacitor elements 2.

(Solid Electrolytic Capacitor Element)

The solid electrolytic capacitor element used in the present invention has such a constitution that a dielectric layer, a semiconductor layer and a conductor layer are stacked on an anode body in this order.

The anode body in the solid electrolytic capacitor element is preferably composed of a porous sintered compact. The sintered compact is preferably a sintered compact of a valve action metallic material or a sintered compact of a conductive oxide. Examples of the valve action metallic material include tantalum, niobium, titanium, zirconium and an alloy containing any one of them. Examples of the conductive oxide include niobium oxide. In order to facilitate the connection to an anode lead, an anode portion is formed on the anode body in advance. The anode portion may be an anode portion in which a portion constituting no cathode portion is partially remained, or an anode lead wire 4 exerted out of the anode body. The size of the anode body can be appropriately selected according to the size of the solid electrolytic capacitor to be determined.

In the solid electrolytic capacitor element, a dielectric layer is formed in the surface of the anode body. The dielectric layer is formed, for example, by anodizing the surface of the anode body. When an anode body composed of a porous body is used, the dielectric layer is also formed in the surface of fine pores in the porous body.

On the dielectric layer, a semiconductor layer is stacked. The semiconductor layer comprises an organic semiconductor or an inorganic semiconductor. On the semiconductor layer, a conductor layer is stacked. Examples of the conductor layer include a conductive carbon layer and a conductive metal layer. The conductor layer is preferably obtained by stacking a conductive carbon layer and a conductive metal layer. The conductor layer in contact with the semiconductor layer is preferably a conductive carbon layer. The semiconductor layer and the conductor layer are usually formed so as to cover the peripheral surface of the element excluding the anode portion. The cathode portion is composed of the semiconductor layer and the conductor layer.

(Lead Frame)

There is no particular limitation on a lead frame used in the production of the solid electrolytic capacitor of the present invention. For example, the lead frame can be appropriately selected from those used in the production of a conventional solid electrolytic capacitor.

The lead frame is in the form of a frame composed of a foil or a flat plate. There is a pair of lead portions laid oppositely toward the inside of the frame. There is a gap between tips of the lead portion. Iron, copper, aluminum or an alloy containing at least one of these metals as main components is used as the material of the lead frame.

The lead frame may be partially or entirely plated with solder, tin, titanium, gold, silver or the like. The lead frame may be subjected to base plating with nickel, palladium, copper or the like.

The lead frame can be subjected to various plating treatments before or after processing of cutting and bending. Before the solid electrolytic capacitor element is laid and connected on the lead frame, the lead frame may be subjected to plating and then subjected to plating at any stage after encapsulating.

(Conductive Adhesive)

There is no particular limitation on the conductive adhesive used in the production of the solid electrolytic capacitor of the present invention. For example, the conductive adhesive may be appropriately selected from those used in the production of a conventional solid electrolytic capacitor. In the present invention, for example, a silver paste is mentioned as a preferable conductive adhesive. The conductive adhesive is preferably thermosetting conductive adhesive. When the thermosetting conductive adhesive is used, it is possible to electrically connect a solid electrolytic capacitor element to a cathode lead only by heating in a state where the solid electrolytic capacitor element is laid on the cathode lead.

(Laying of Solid Electrolytic Capacitor Element on Lead Frame and Connection Thereof)

In the method for producing a solid electrolytic capacitor of the present invention, first, a plurality of solid electrolytic capacitor elements are laid in proximity to each other in parallel on a cathode lead portion of a lead frame through a conductive adhesive. For example, solid electrolytic capacitor elements are laid as shown in FIG. 1.

Before laying the solid electrolytic capacitor element on the cathode lead portion, a conductive adhesive 7 is applied on one or both surfaces for connection of the cathode lead and the solid electrolytic capacitor element.

The conductive adhesive is applied so that the conductive adhesive 7a gets into a gap between solid electrolytic capacitor elements 2 laid in proximity to each other. The conductive adhesive is preferably applied so that the conductive adhesive 7b does not protrude out of the maximum external dimension of the solid electrolytic capacitor element, or does not protrude out of the lead frame. It is more preferable that the conductive adhesive 7b is held on the connection surface between the cathode lead and the solid electrolytic capacitor element. Furthermore, it is preferable that the conductive adhesive is filled in the entire connection surface between the cathode lead and the solid electrolytic capacitor element. When the non-filled portion remains, ESR may increase because of insufficient electrical connection between the cathode lead and the solid electrolytic capacitor element.

The method of applying the conductive adhesive is not particularly limited as long as the conductive adhesive can get into a gap between solid electrolytic capacitor elements. And the applying method can be appropriately selected according to the shape of the lead frame or the solid electrolytic capacitor element. For example, the conductive adhesive can be applied as points at the several positions on the connection surface, or can be applied linearly on the connection surface. In order to make the conductive adhesive easily get into a gap between solid electrolytic capacitor elements, it is preferred to apply a larger amount of the conductive adhesive on the connection surface close to the gap between solid electrolytic capacitor elements. Specific conditions of the application of the conductive adhesive can be appropriately determined by a preliminary test before actual production.

The width of the gap between solid electrolytic capacitor elements laid on the cathode lead is not particularly limited as long as it can receive the conductive adhesive getting into the gap. The smaller the width of the gap, the more easily the effect of decreasing deviation of ESR can be obtained. The reason is considered as follows. The smaller the width of the gap, the larger deviation of the width of each gap relative to an average width of the gap relatively, thus exerting an influence on the deviation of ESR.

In order to further decrease the deviation of ESR, the average width of the gap is preferably 250 μm or less, more preferably 150 μm or less, and still more preferably 30 μm or less.

The width of the gap between solid electrolytic capacitor elements in the present invention can be determined by observing the gap in a state where the solid electrolytic capacitor elements are laid on the lead frame using a magnifying glass. For example, in the case of a solid electrolytic capacitor element of a hexahedron, as shown in FIG. 2, a distance A between an edge and an edge is measured. Even when solid electrolytic capacitor elements are laid in contact with each other, due to fine unevenness of the surface of the solid electrolytic capacitor element, it is uncommon that there is no gap between solid electrolytic capacitor elements. For easier understanding of the gap, unevenness of the surface of the solid electrolytic capacitor element is simply drawn with emphasis as compared with an actual case in FIG. 2.

Next, the solid electrolytic capacitor element is electrically connected to the cathode lead portion so that the conductive adhesive gets into a gap between the solid electrolytic capacitor elements.

There is no particular limitation on the method of allowing the conductive adhesive to get into a gap between solid electrolytic capacitor elements. The method includes, for example, a method comprising applying a larger amount of the conductive adhesive on the edge of the connection surface which is the gap side of the solid electrolytic capacitor element to be laid. In the present invention, the method of allowing the conductive adhesive to get into the gap between solid electrolytic capacitor elements is preferably a method comprising pressing a plurality of solid electrolytic capacitor elements laid on the cathode lead portion against the cathode lead portion through a conductive adhesive layer. When the solid electrolytic capacitor elements are pressed against the cathode lead portion, the conductive adhesive existing between the cathode lead and the solid electrolytic capacitor elements is pushed out to the side and gets into the gap between solid electrolytic capacitor elements. The solid electrolytic capacitor elements may be pressed against the cathode load portion from the direction vertical to the connection surface between the cathode lead and the solid electrolytic capacitor elements, or from the direction in which a pressing force is concentrated on the gap between solid electrolytic capacitor elements.

The pressure in the case of pressing varies depending on the kinds of the solid electrolytic capacitor element and the conductive adhesive, and is at least the pressure enough to allow the conductive adhesive to get into the gap between solid electrolytic capacitor elements and at most the pressure which does not exert an adverse influence on electrical characteristics of the solid electrolytic capacitor elements. The pressure in the case of pressing is usually from 0.01 to 10 MPa, and preferably from 0.1 to 1 MPa. The height reached by the conductive adhesive getting into a gap varies depending on the width of the gap, but is the height equal to or less of the solid electrolytic capacitor element, and usually from 0.03 to 0.13 mm.

Simultaneously with the pressing operation, a curing operation of the conductive adhesive is preferably conducted. The curing operation of the conductive adhesive is appropriately selected according to the kind of the conductive adhesive.

The pressing operation may be continued until the conductive adhesive is completely cured but may be stopped when the conductive adhesive is cured to the degree where it does not flow.

For example, when a thermosetting conductive adhesive is used, a solid electrolytic capacitor element is laid on a cathode lead and heat is applied while pressing the solid electrolytic capacitor. Pressing is stopped when the conductive adhesive is cured to the degree where it does not flow, and then heating can be continued until the conductive adhesive is completely cured without pressing. In such a case, an optimum pressing time varies depending on the kind of the conductive adhesive, but is usually from 0.5 to 500 seconds.

As described above, the cathode portion of the solid electrolytic capacitor element and the cathode lead are connected in a conductive state. The cathode lead is partially exposed outside or on the surface of an outer packaging of the solid electrolytic capacitor to form a cathode terminal.

On the other hand, an anode portion of the solid electrolytic capacitor element is electrically connected to an anode lead. Connection between the anode portion and the anode lead is usually conducted by welding. The anode lead is partially exposed outside or on the surface of an outer packaging of the solid electrolytic capacitor to form an anode terminal.

(Encapsulating of Solid Electrolytic Capacitor Elements)

After connecting a solid electrolytic capacitor elements to a load frame, they are encapsulated. There is no particular limitation on the encapsulating method and examples thereof include resin mold outer packaging, resin case outer packaging, metal case outer packaging, outer packaging by dipping of a resin, outer packaging using a laminate film and the like. Of these outer packagings, resin mold outer packaging is preferable since miniaturization and cost reduction can be simply conducted.

There is no particular limitation on an encapsulating material used in the encapsulating. Examples thereof include a resin, a metal case, a resin case, a resin film and the like. Of these materials, a resin is preferable. Examples thereof include an epoxy resin, a phenol resin, an alkyd resin and the like. It is preferred to use a low stress resin as an encapsulation resin as it is possible to relieve stress, which exerts an adverse influence on the solid electrolytic capacitor element, generated during encapsulating. A transfer machine is preferably used as a manufacturing equipment for resin mold outer packaging. The resin used for outer packaging may contain fillers such as silica particles.

The solid electrolytic capacitor thus obtained may be aged. This aging enables restoring of a dielectric layer on which thermal load and/or mechanical load were applied during the above production process. The aging method is conducted by applying predetermined voltage, which is usually within two times as a rated voltage, to the solid electrolytic capacitor. The aging time and aging temperature are determined by a test in advance since an optimum value varies depending on the size, capacity and rated voltage of the solid electrolytic capacitor. The aging time is usually from several minutes to several days, and the aging temperature is usually 300° C. or lower taking heat deterioration of a voltage application jig into consideration.

The solid electrolytic capacitor of the present invention can be preferably used for circuits which require a high capacity capacitor, for example, CPU and power supply circuits. These circuits can be employed for various digital equipment such as personal computers, servers, cameras, game machines, AV instruments and mobile terminals, and electronic equipment such as electronic equipment such as various power supplies.

Since the solid electrolytic capacitor of the present invention shows narrow deviation of ESR, it is possible to obtain a stable electronic circuit or electronic equipment that is easily designed by mounting the solid electrolytic capacitor of the present invention.

EXAMPLES

Examples and Comparative Examples are shown to illustrate the present invention in more specifically. The following Examples have been presented for the purposes of illustration and not intended to limit the scope of the present invention. In the Examples, percentage (s) and ppm(s) are by mass unless otherwise specified.

Example 1

Production of Solid Electrolytic Capacitor Element

Utilizing hydrogen brittleness, a niobium ingot was crushed to obtain a niobium powder having an average particle diameter of 0.31 μm. The niobium powder was granulated to obtain a niobium granula having an average particle diameter of 128 μm. The niobium granula was subjected to natural oxidation and contains 1% of oxygen. Next, this niobium granula was allowed to stand in a nitrogen atmosphere at 450° C. for 1 hour and was subsequently allowed to stand in argon at 700° C. for 2 hours to obtain a partially nitrided niobium granula. The partially nitrided niobium granula was 1% in a nitriding ratio, 220,000 μF·V/g in a CV value.

The partially nitrided niobium granula was compacted together with a niobium wire having a diameter of 0.40 mm and sintered at 1,310° C. to produce 6,400 sintered compacts each measuring 4.5 mm in length, 1.5 mm in width and 1.0 mm in height. Deviation of the length was ±0.2 mm, and deviation of the width and deviation of the height were respectively ±0.1 mm. In these sintered compacts, the niobium wire was embedded at the center of a surface measuring 1.5 mm×1.0 mm of the sintered compact in a depth of 3.8 mm, and also protrudes out of the sintered compact in a length of 10 mm. The niobium wire was an anode lead wire.

The anode lead wire of the sintered compact was inserted into a washer made of tetrafluoroethylene being 0.37 mm in inner diameter, 0.80 mm in outer diameter and 0.20 mm in thickness, and then the washer was fixed as a mark at the position apart by 0.15 mm from the sintered compact. The anode lead wire in the sintered compact side from this washer and the sintered compact were anodized at 8 V to form a dielectric layer in each surface of them. On the dielectric layer, a semiconductor layer made of polyethylene dioxithiophene was formed by electrolytic polymerization. Then, a conductor layer was formed on the periphery of the semiconductor layer, excluding the vicinity of the connection portion of the anode lead wire and the sintered compact, thus producing a solid electrolytic capacitor element. The above conductor layer was formed by stacking a carbon paste and a silver paste in this order through application.

The above operation was repeated to produce 6,400 solid electrolytic capacitor elements.
(Connection of Solid Electrolytic Capacitor Element and Lead Frame)

A 0.1 mm thick, lead frame made of a copper alloy (trade name: C-151SH) with a 0.7 μm base nickel formed thereon and a 7 μm tin mat plating formed thereon was prepared. This lead frame was in the form of having a pair of convex portions facing toward the inside of the frame. The convex portions were a cathode lead and an anode lead. One lead frame had 32 pairs of convex portions. There was a gap of 1 mm between the cathode lead and the anode lead. The cathode lead was subjected to step bending measuring 3.5 mm in width, 4.7 mm in length and 0.45 mm in height, as shown in FIG. 1.

A conductive adhesive (silver paste QMI-529HT, manufactured by Henkel Corporation) was dropped using a dispenser at 6 points in which the 3 points were symmetrically rowed in a longitudinal direction on the cathode lead, before the solid electrolytic capacitor elements were laid. The distance between the drop centers was set to 1.45 mm in length and width. The drop amount of the conductive adhesive was set to 0.175 g per one lead frame, that is, per 32 cathode leads.

On one cathode lead on which the conductive adhesive was dropped, two solid electrolytic capacitor elements were laid in parallel in the same direction so that the surface measuring 4.5 mm×1.5 mm was faced to the cathode lead. The anode lead wire of the solid electrolytic capacitor element was cut into a predetermined dimension, a tip of the anode lead wire was collapsed, and the anode lead wire was electrically connected to the anode lead of the lead frame by resistance welding.

The above operation was repeated and 64 solid electrolytic capacitor elements were laid on 32 pairs of cathode and anode leads.

Next, the lead frame on which the above solid electrolytic capacitor elements were laid was placed on a metal plate heated at 280° C. and pressing was conducted for 40 seconds from the above using a metal plate with a silicone rubber affixed thereon so that the pressure applied on each solid electrolytic capacitor element was 0.2 MPa, thereby curing the conductive adhesive. By curing the conductive adhesive, each solid electrolytic capacitor element was electrically connected to the cathode lead.

The above operation was repeated to produce 100 lead frames in which the solid electrolytic capacitor element was connected with the conductive adhesive.

Ten lead frames connected to the solid electrolytic capacitor elements were selected at random and, with respect to 320 pairs of solid electrolytic capacitor elements connected to the frames, a state of the conductive adhesive and a state of the gap between solid electrolytic capacitor elements were observed using a magnifying glass.

There was not any pair in which the conductive adhesive protruded out the maximum external dimension of the solid electrolytic capacitor element.

An average width of the gap between solid electrolytic capacitor elements was 0.15 mm.

Among the 320 pairs of solid electrolytic capacitor elements, 264 pairs were not in contact with each other between two solid electrolytic capacitor elements arranged in proximity to each other and the presence of a gap could be observed. The 264 pairs of solid electrolytic capacitor elements were within a range from 0.24 mm to 0.01 mm in the width of the gap, and within a range from 0.03 mm to 0.09 mm in the height reached by the conductive adhesive getting into the gap.

Among the 320 pairs of solid electrolytic capacitor elements, 52 pairs were partially in contact with each other between two solid electrolytic capacitor elements arranged in proximity to each other, but the presence of a gap could be observed. The 52 pairs of solid electrolytic capacitor elements were within a range from 0.11 mm to 0.01 mm in the width of the gap, and within a range from 0.06 mm to 0.13 mm in the height reached by the conductive adhesive getting into the gap.

Among the 320 pairs of solid electrolytic capacitor elements, 4 pairs were tightly in contact with each other between two solid electrolytic capacitor elements arranged in proximity to each other, but the presence of a gap could not be observed by a magnifying glass.

The height reached by the conductive adhesive getting into a gap was determined by peeling the solid electrolytic capacitor element from the cathode lead and measuring the height from the cathode lead surface at the tip position of the remaining conductive adhesive as shown in C of FIG. 2. The smaller the width of the gap between solid electrolytic capacitor elements, the more the height reached by the conductive adhesive tends to increase.

(Production of Solid Electrolytic Capacitor)

The other 90 lead frames were allowed to stand under reduced pressure at 190° C. for 2 hours thereby completely curing the conductive adhesive. After cooling to room temperature, the lead frames were laid on a predetermined mold and then were encapsulated by transfer molding using an epoxy resin. Thereafter, an aging treatment was conducted, the portion protruding out of the outer packaging of the lead frame was cut into a predetermined dimension, followed by bending to obtain 2,880 solid electrolytic capacitors each measuring 7.3 mm×4.3 mm×1.8 mm.

The solid electrolytic capacitor had a rated voltage of 2.5 V and a capacity of 680 µF. The 2,880 solid electrolytic capacitors had an average ESR of 5.2 mΩ, a minimum ESR value of 4.7 mΩ, a maximum ESR value of 6.2 mΩ and standard deviation of ESR of 0.15 mΩ.

Comparative Example 1

A lead frame connected to the solid electrolytic capacitor elements was produced in the same manner as in Example 1 except that the lead frame on which the solid electrolytic capacitor elements were laid was not pressed. The 10 lead frames connected to the solid electrolytic capacitor elements were selected at random, and the 320 pairs of solid electrolytic capacitor elements were observed in the same manner as in Example 1 using a magnifying glass. There was not any pair in which the conductive adhesive protruded out the maximum external dimension of the solid electrolytic capacitor element. There was not any pair in which the conductive adhesive gets into the gap between the solid electrolytic capacitor elements. An average width of the gap between solid electrolytic capacitor elements was 0.14 mm.

In the same manner as in Example 1 except that the 90 lead frames connected to the solid electrolytic capacitor elements were used, 2,880 solid electrolytic capacitors were produced.

The solid electrolytic capacitor had a rated voltage of 2.5 V and a capacity of 680 µF.

The 2,880 solid electrolytic capacitors had an average ESR of 5.6 mΩ, a minimum ESR value of 5.0 mΩ, a maximum ESR value of 10.6 mΩ, and standard deviation of ESR of 0.41 mΩ.

Comparative Example 2

In the same manner as in Example 1, except that the sintered compact was replaced by a sintered compact measuring 4.5 mm in length, 3.0 mm in width and 1.0 mm in height, 3,200 solid electrolytic capacitor elements were obtained.

A lead frame connected to a solid electrolytic capacitor element was obtained in the same manner as in Example 1 except that one solid electrolytic capacitor element described above was laid on uric cathode lead.

The 10 lead frames connected to the solid electrolytic capacitor elements were selected at random and the 320 solid electrolytic capacitor elements were observed in the same manner as in Example 1 using a magnifying glass. In almost all of the 320 solid electrolytic capacitor elements, the conductive adhesive protrudes out of the maximum external dimension of the solid electrolytic capacitor element.

In the same manner as in Example 1, except that 90 lead frames connected to the solid electrolytic capacitor element were used, 2,880 solid electrolytic capacitors were produced.

The solid electrolytic capacitor had a rated voltage of 2.5 V and a capacity of 680 µF.

The 2,880 solid electrolytic capacitors had an average ESR of 11.6 mΩ, a minimum ESR value of 8.7 mΩ and a maximum ESR value of 16.6 mΩ, and standard deviation of ESR of 0.37 mΩ.

As is apparent from the above, the solid electrolytic capacitor in which a conductive adhesive is allowed to get into a gap between solid electrolytic capacitor elements laid in proximity to each other in accordance with the production method of the present invention has a small average of ESR and also enables a remarkable decrease deviation of ESR.

REFERENCE SIGNS LIST

1: Solid electrolytic capacitor element
2: Gap between solid electrolytic capacitor elements
3: Cathode lead
4: Anode lead wire
5: Anode lead
6: Welded portion
7: Conductive adhesive
7a: Conductive adhesive getting into gap
7b: Conductive adhesive protruding from the side
A: Width of gap between solid electrolytic capacitor elements
B: Size of maximum external dimension of solid electrolytic capacitor element
C: Height reached by conductive adhesive getting into gap

What is claimed is:

1. A method for producing a solid electrolytic capacitor, which comprises the steps of:
   laying a plurality of solid electrolytic capacitor elements in proximity to each other in parallel on a cathode lead portion of a lead frame through a conductive adhesive, and
   electrically connecting the solid electrolytic capacitor elements to the cathode lead portion so that the conductive adhesive gets into a gap between the solid electrolytic capacitor elements.

2. The method for producing a solid electrolytic capacitor according to claim 1, wherein an average width of the gap between the solid electrolytic capacitor elements is set to 250 µm or less.

3. The method for producing a solid electrolytic capacitor according to claim 1, wherein the step of electrically connecting the solid electrolytic capacitor elements to the cathode lead portion so that the conductive adhesive gets into the gap between the solid electrolytic capacitor elements includes pressing the plurality of solid electrolytic capacitor elements laid on the cathode lead portion through a conductive adhesive layer against the cathode lead portion.

4. The method for producing a solid electrolytic capacitor according to claim 1, which prevents the conductive adhesive from protruding cut of a maximum external dimensions of the plurality of solid electrolytic capacitor elements laid on the cathode lead portion.

5. The method for producing a solid electrolytic capacitor according to claim 1, wherein the conductive adhesive is a silver paste.

6. The method for producing a solid electrolytic capacitor according to claim 1, wherein the solid electrolytic capacitor element is made by preparing a sintered compact of a valve action metallic material or a sintered compact of a conductive oxide as an anode body, and forming a dielectric layer in the surface of the anode body, and then stacking a semiconductor layer and a conductor layer on the dielectric layer in this order.

7. A solid electrolytic capacitor produced by the method according to claim 1.

8. A solid electrolytic capacitor comprising:
an anode lead and a cathode lead facing each other while being separated,
two or more solid electrolytic capacitor elements comprising an anode portion and a cathode portion, and an encapsulating material for encapsulating the anode lead, the cathode lead and the solid electrolytic capacitor elements, wherein the two or more solid electrolytic capacitor elements are laid in proximity to each other in parallel, the anode portion of the elements is conductively connected to a tip of the anode lead, the cathode portion of the elements is conductively connected to a tip of the cathode lead with a conductive adhesive, and also the conductive adhesive gets into a gap between the solid electrolytic capacitor elements.

\* \* \* \* \*